United States Patent [19]

Karapetian

[11] 4,274,391
[45] Jun. 23, 1981

[54] STEAM TABLE

[76] Inventor: Vahe Karapetian, 762 E. Slauson, Los Angeles, Calif. 90011

[21] Appl. No.: 953,649

[22] Filed: Oct. 23, 1978

[51] Int. Cl.³ .......................... F24B 9/00; F24D 1/00; A47J 27/06
[52] U.S. Cl. ..................................... 126/33; 126/377; 126/369
[58] Field of Search .................. 126/33, 369, 377, 20, 126/281, 284

[56] References Cited

U.S. PATENT DOCUMENTS

| 1,734,667 | 11/1929 | Fiore | 126/33 |
| 1,948,425 | 2/1934 | Mayberry | 126/33 |
| 1,964,805 | 7/1934 | Barnes | 126/33 |
| 2,471,420 | 5/1949 | Elkin | 126/33 |

Primary Examiner—Albert W. Davis
Assistant Examiner—Wesley S. Ratliff, Jr.
Attorney, Agent, or Firm—Julius L. Rubinstein

[57] ABSTRACT

A steam table adapted to hold containers of food comprises an open tank for holding the water used to heat the food. The tank has a double bottom, and water, separate from the water used to heat the food, fills the double bottom. Heat is supplied to the double bottom to heat the water there, and this heated water both heats the water in the open tank used to heat the food and, in addition, provides hot water for the sink. Water is gravity fed to the double bottom of the steam table by a reservoir mounted above the steam table.

16 Claims, 3 Drawing Figures

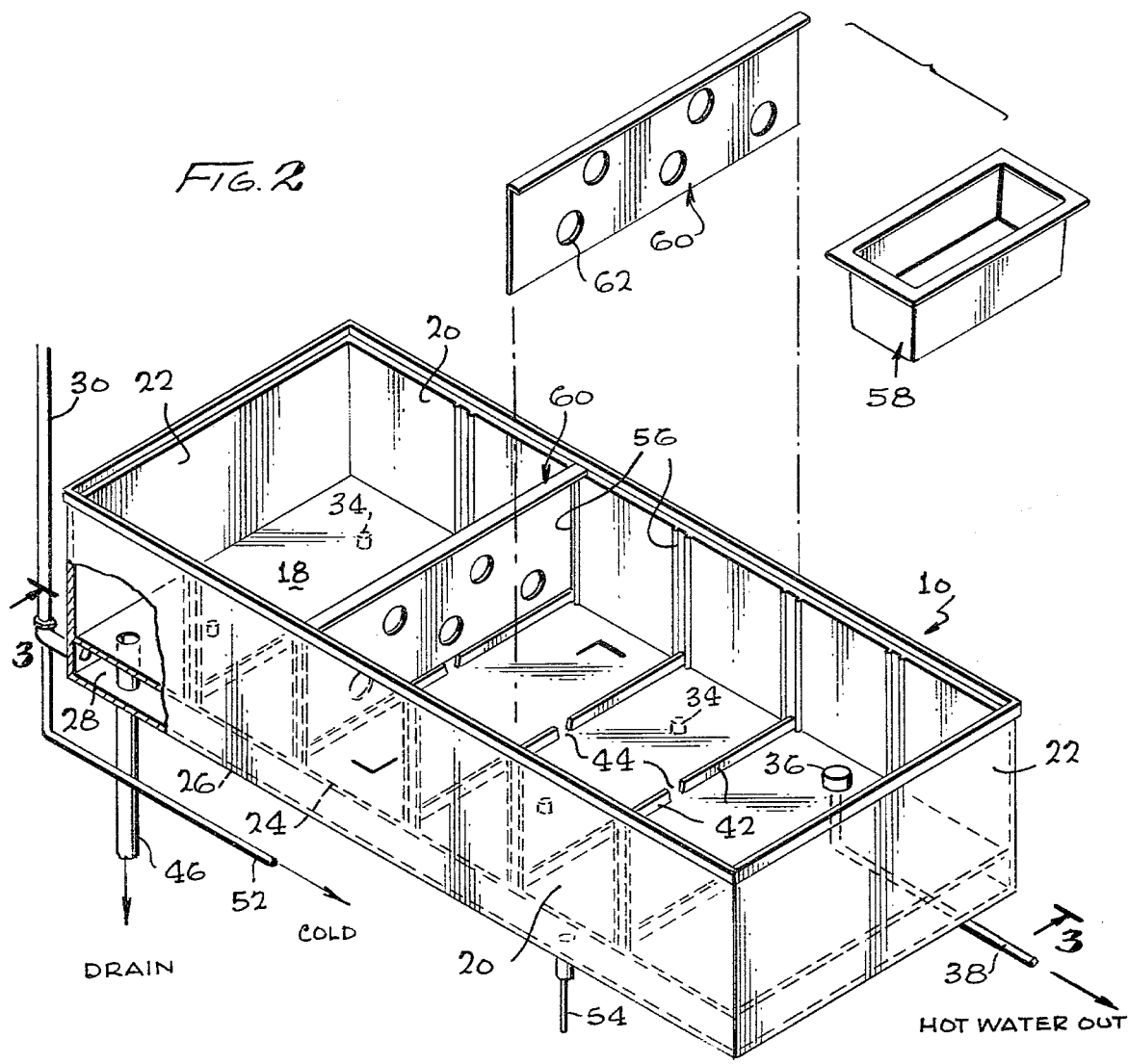

STEAM TABLE

BACKGROUND AND BRIEF SUMMARY

Catering trucks require hot water for two purposes. One is to heat the food in the steam table and the other is for washing dishes and general cleaning purposes. Heretofore, catering trucks employed separate burners to provide the hot water required. One burner was in a hot water heater and was used to supply hot water for the sink. This hot water heater was generally mounted outside the truck. The other burner was mounted inside the truck and was used to heat the water in the steam table for heating the food. The burner in the hot water heater mounted outside the truck was exposed to dirt kicked up from the road, rain, and corrosion, which caused the burner to become unreliable. When the hot water heater failed, the source of hot water for cleaning purposes stopped. Since laws regulating the operation of catering trucks require a constant source of hot water as a condition for doing business, a failure in the hot water heater stopped business until the hot water heater could be fixed. In addition, the hot water heater heretofore required a battery operated electric pump to move the water to the steam table from the hot water tank. This also created problems because, if the pump was operating while the motor was off, the battery would run down, causing the pump to stop and under some circumstances prevent the truck from starting. In either case, business had to stop until hot water could again be supplied to the sink. Of course, the motor in the truck could be left operating to keep the battery charged while the truck was doing business, but this is prohibitively expensive, particularly since the cost of fuel has risen so high.

The hot water from the water heater, which is connected to the sink, must be supplied with sufficient pressure. This made attempts to put a water tank in the form of coiled tubing connected to the hot water heater, in, under, or along side the steam table so that the heated water in the coiled tubing could heat the water in the steam table and supply heated water to the sink, impractical. This is because the turns of the coiled tubing increased water friction to such an extent that it required a large, expensive pump to force the water through the tube into the sink at a useful water pressure. This arrangement also eliminated the practical possibility of using gravity to force water through the coiled tubing to the sink in order to eliminate the expense and reliability problems inherent in a water pump.

What is needed, therefore, and comprises an important object of this invention, is to provide a catering truck with a steam table which has a reliable source of hot water and which is not affected by road or atmospheric conditions.

Another object of this invention is to provide a hot water supply for heating food in a catering truck and for providing a source of hot water for a sink which is economical to manufacture, reliable, and which does not require any moving parts and which saves gas.

Yet another object of this invention is to provide a steam table for a catering truck which utilizes a gravity feed in combination with a single source of heat for providing hot water for the sink at a useful pressure and which provides the heat for the water inside the steam table.

This is now accomplished in the steam table described herein, wherein the steam table is an open top tank adapted to be filled with water. The tank is designed to hold containers of food which are heated by the water in the tank. The tank has a double bottom which contains water separate from the water in the steam table. Heat is supplied to the water in the double bottom which heats the water contained in the open top tank. The heated water in the double bottom is also connected to a sink and provides a source of hot water for cleaning. The number of obstructions inside the double bottom tank is minimal so that gravity is practical for forcing water through the double bottom tank to the sink at a useful pressure. In this way, a single burner protectively mounted inside the truck is used to heat the steam table and supply hot water at a useful pressure to the sink.

Other objects of this invention will become more apparent when better understood in the light of the specification and accompanying drawings wherein:

FIG. 2 is an exploded perspective view of a steam table constructed according to the principles of this invention.

FIG. 3 is a sectional view taken on a line 2—2 of FIG. 1.

Figure 1:
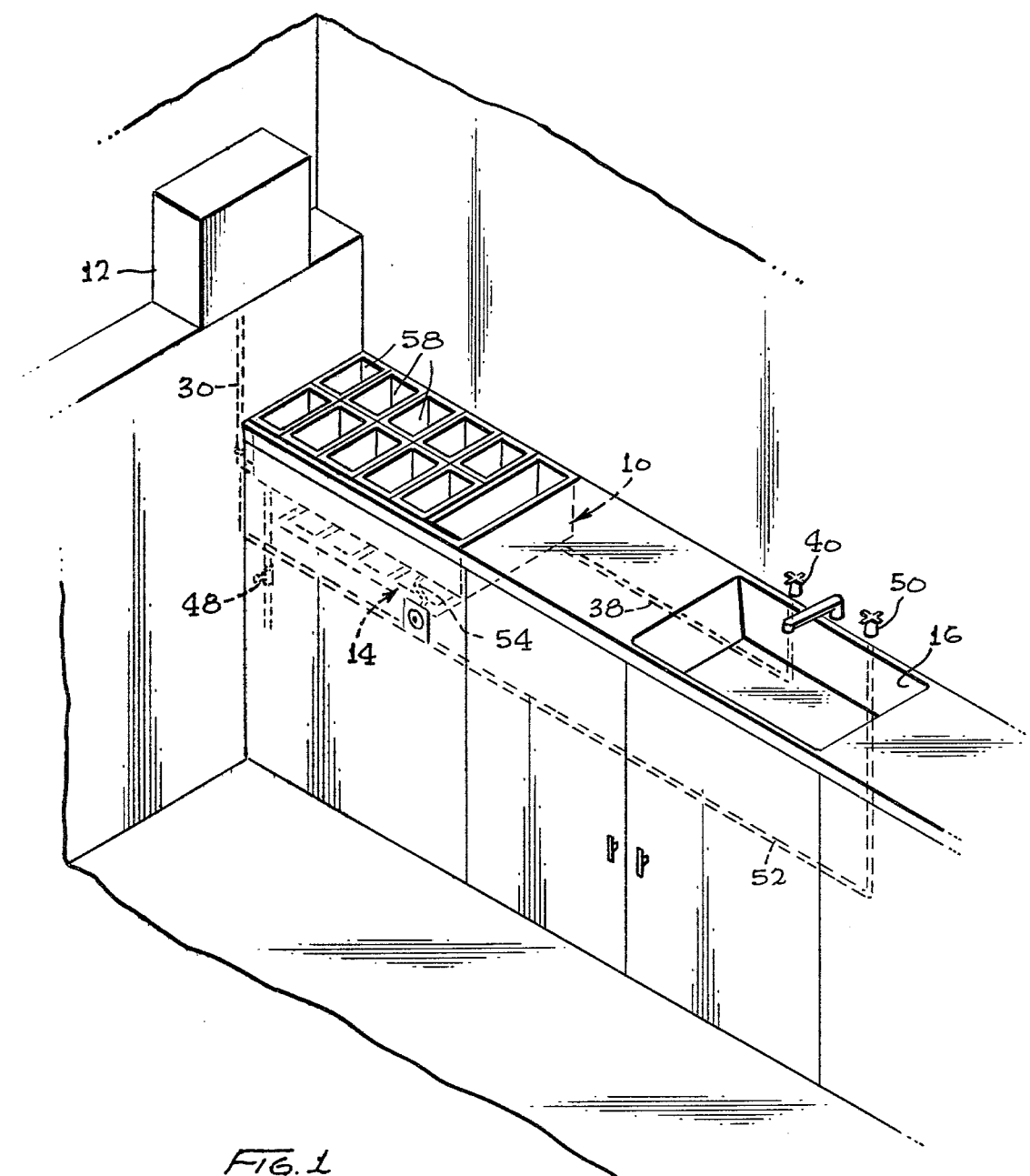
FIG. 1 is a perspective view of the interior of a catering truck, showing the layout of the steam table, the reservoir, the burner, and the sink.

Referring now to FIG. 1 of the drawings, the interior of a catering truck is provided with a steam table indicated generally by the reference numeral 10. A water reservoir 12 is mounted above the steam table, and a burner 14 is mounted below the steam table. A sink 16 is mounted along side the steam table.

The steam table 10 as seen in FIG. 2 is generally rectangular in shape with an open top. The steam table has a double bottom 18, upwardly projecting side walls 20 and end walls 22. The bottom 18 of the steam table comprises an upper base 24 and a lower base 26, see FIG. 3. The upper and lower side walls 20 and 22 cooperate with the upper and lower bases to define a closed space 28 which forms a tank 32 beneath the steam table bottom 18. Water from reservoir 12 is gravity fed through water line 30 to tank 32, filling the space 28 with water, see FIGS. 2 and 3. The burner 14 is mounted below tank 32 and when the burner is operating, it heats the water inside the tank, see FIG. 1.

In order to more effectively use the burner heat to heat the water inside the steam table above bottom 18, advantage is taken of the necessity of using several metal supports to prevent the weight of the water in the steam table from deforming the upper base 24 or requiring the base to be formed from a very heavy metal which would increase the cost of the steam table. As seen in FIG. 3, several metal supports or bosses 34 are secured by any suitable means, such as welding, to the facing surfaces of bases 24 and 26. Consequently, when the burner is operating, the heat is transferred more directly to the water in the steam table through the better conductivity of the supports 34 as well as through the heat transferred to base 24 through the heated water in the tank 32.

Air is a poor conductor of heat in comparison to water, and air bubbles in tank 32 would decrease the efficiency of burner 14 in heating the steam table. To eliminate air in tank 32, a boss 36 is formed in base 24 which projects slightly above the surface of base 24, see FIG. 3. An upwardly open water pipe 38 is mounted in the tank 32 which projects inside the boss 36 above the level of base 24. The opposite end of the water pipe 38 is connected to hot water faucet 40 in the sink 16, see FIG. 1. In this way, when the tank 32 is filled with water, air bubbles which rise to the upper base 24 enter into the boss 36 and flow through the pipe 38 to the sink. If the faucet 40 is opened briefly when the tank 32 is filled, the air bubbles would escape from the tank 32, leaving only the water.

As seen in FIG. 2, upwardly projecting ribs 42 are formed on the base 24 of the steam table. These ribs have two functions. One is to strengthen the base 24 and the other is to provide better heat transmission from the water in tank 32 to the water inside the steam table. In addition, some of the supports 34 are integrally secured to some of the ribs and this direct connection from the flames in the burner to the support 34 and to the ribs further increases the heat transmission from the burner to the interior of the steam table, see FIG. 3.

As seen in FIG. 2, the ribs are separated, defining a channel 44 on the bottom of the steam table. This is to help drain the water out of the steam table when it is required. To drain the water from the steam table, a drain pipe 46 is mounted in the bottom 18 of the steam table, see FIG. 3. One end of the drain pipe communicates with the interior of the steam table. A valve 48, see FIG. 1, controls the drainage of water from the steam table. As stated above, hot water from tank 32 is connected to the hot water faucet 40. Cold water from the reservoir is connected to faucet 50 in sink 16 through line 52. The temperature in tank 32 is controlled by a generally conventional thermostat 54.

It is noted that except for the support 34 inside tank 32, the interior of the tank 32 is free of all obstructions. This is important because it permits a gravity feed from a reservoir through the water tank 32 to the hot water faucet at a useful pressure. If attempts were made to heat the interior of tank 32 or the interior of the steam table by installing coiled water lines inside tank 32 or the interior of the steam table, or against the walls of the steam table, and circulating hot water through these coiled water lines, the turns of the coils would produce so much frictional resistance to the water gravity would not provide a useful pressure at the hot water faucet and an electric pump would be required. This would be objectionable for the reasons described above.

Food containers for steam tables are generally standard or modular in size and for convenience, grooves 56 are integrally formed in the side walls 20 of the steam table. These grooves are spaced apart the width of the containers 58. Separators 60, which are equal in length to the width of the steam table, are edge mounted inside these grooves 56, see FIG. 2. These separators have two functions. One is to hold the food containers 58 in fixed relationship with respect to each other and the other is to prevent the water in the steam table from spilling over the sides of the steam table when the truck is operating. For better drainage and heat transmission, the separators 60 are provided with openings 62 formed therein.

As seen in FIG. 2, in assembled relationship the dividers or separators 60 are mounted in grooves 56. This separates the tank into modularly sized sections. Then the food containers 58 are mounted in each section as shown in FIG. 3.

In summary, it is clear that a single burner protectively mounted inside the catering truck provides hot water for the steam table and for the sink. In addition, since the interior of the water tank 32 is substantially free of obstructions, water can be gravity fed through the tank 32 to the sink 16 by putting the reservoir 12 above the steam table. This eliminates the necessity of an expensive and often unreliable electric pump.

Although the principles of this invention have been applied to a catering truck, it is also apparent that the steam table, reservoir, burner, and sink shown in FIG. 1 could be advantageously installed in other vehicles, such as boats or airplanes, which heat pre-cooked food to be served to the passengers being carried, or in fast food restaurants.

Having described the invention, what I claim is new is:

1. A steam table comprising an open top tank, said tank having a double bottom comprising an upper base and a lower base defining a water tank integral with said steam table beneath said upper base, said water tank having a water inlet and a water outlet, and means in said water tank for eliminating air bubbles in the water tank which enter the water tank when water is fed into the water tank through said water inlet.

2. The steam table described in claim 1 wherein said means for eliminating air bubbles comprises an upwardly projecting boss formed in the upper base of said tank, a water tube mounted in said water tank, one end of said boss projecting upwardly and open and mounted inside said boss above the level of said upper base, the opposite end of said tube adapted to be connected to a sink whereby if water enters the water inlet, the bubbles in the water tank are forced into said boss and out of said water tank through said tube.

3. The apparatus described in claim 1 wherein a heat transmitting structural element is mounted in said water tank connected to the upper and lower bases of the steam table both to strengthen the upper base of said steam table and to provide a highly conductive heat path from any burner mounted below the water tank to the interior of the steam table.

4. The steam table described in claim 8 wherein said upper base is provided with integral uniformly spaced parallel ribs both to strengthen the upper base and to provide an increased heat transfer surface from the water in the water tank to any water in the interior of the steam table.

5. The steam table described in claim 4 wherein a valve controlled drain pipe is mounted in the bottom of the steam table for draining water out of the steam table, each rib separated in two parts defining a path in the bottom of the steam table to said drain pipe whereby the steam table can be conveniently drained.

6. A steam table comprising an open top tank, said tank having a double bottom comprising an upper base and a lower base defining a water tank beneath said upper base, said water tank having a water inlet and a water outlet, an upwardly projecting boss formed in the upper base of said steam table, an outlet tube mounted in said water tank, one end of said tube open and mounted inside said boss in the upper base and extending upwardly, the opposite end of said tube adapted to be connected to a sink whereby if water enters the water inlet of the water tank any air bubbles in the water tank are forced into said boss and out of the water tank through said tube, said upper base provided with integral uniformly spaced parallel ribs both to strengthen the upper base and to provide a increased heat transfer surface to any water in the interior of the steam table, said ribs formed in two sections defining a water path therebetween, a valve control drain pipe mounted in the bottom of the steam table for draining water out of the steam table.

7. The steam table described in claim 6 wherein said steam table is rectangular in cross section comprising a base and transverse upwardly projecting side walls and end walls, uniformly spaced grooves formed in the side walls of said steam table, said grooves in uniformly spaced parallel relationship to each other and spaced apart a distance equal to the modular width of food containers adapted to be mounted inside the steam table, and dividers, the length of said dividers equal to the width of said steam whereby the ends of the dividers can be inserted in the grooves and side walls of the steam table to divide the interior of the steam table into modular food container receiving spaces, said dividers provided with holes extending therethrough whereby the dividers additionally function to prevent water in the steam table from splashing out of the steam table when the steam table is being moved in a vehicle.

8. An apparatus of the class described comprising a steam table, a sink for washing dishes and pots and pans, a water reservoir mounted above the steam table and the sink, said steam table comprising an open top tank, said open top tank adapted to be filled with water for heatng food, a water tank integral with and abutting against said open top tank, a heat producing device for heating the water in at least one of said tanks whereby the temperature of the water is said at least one of said tanks controls the temperature of the water in the other tank, a first water line connected from the water reservoir to the water tank, a second water line connected from the water tank to the sink so that water from the reservoir is gravity fed to the water tank and the sink, whereby said heat producing device heats the water in said at least one tank both to heat the water in the other tank and to provide hot water to the sink.

9. In a catering truck, a steam table, a water reservoir, an open top sink for washing dishes, and a heat producing device, said water reservoir mounted above the steam table and the sink, said steam table comprising an open top tank, a water tank in fixed relationship to the steam table positioned adjacent the bottom of the steam table, a first water line connected from the reservoir to said water tank, a second water line connected from the water tank to said sink, said heat producing device in fixed relation to said tanks for heating water therein, whereby the heated water in the water tank provides hot water for the sink, said water tank having upper and lower base members, said base members spaced far enough apart so that the frictional resistance of the flow of water through the water tank from the first water line to the second water line is minimized so that the pressure of the water entering the sink depends primarily on the height of the water reservoir above the sink and not on the internal structure of the water tank.

10. In a catering truck, a steam table, a water reservoir, an open top sink for washing dishes, and a heat producing device, said water reservoir mounted above the steam table and the sink, said steam table comprising an open top tank, a water tank in fixed relationship to the steam table positioned adjacent the bottom of the steam table, a first water line connected from the reservoir to said water tank, a second water line connected from the water tank to said sink, said heat producing device in fixed relation to said tanks for heating the water therein, whereby the heated water in the water tank provides hot water for the sink, said water tank comprising upper and lower horizontal base members and side walls whereby the frictional resistance of the flow of water through the water tank from the first water line to the second water line is minimized and the flow of water from the first water line entering said water tank to the second water line leaving the water tank is generally unobstructed so that the pressure of the water entering the sink depends primarily on the height of the water reservoir above the sink and not on the internal structure of the water tank.

11. In a catering truck, a steam table, a water reservoir, an open top sink for washing dishes and pots and pans, and a heat producing device, said water reservoir mounted above the steam table and the sink, said steam table comprising an open top tank, a water tank in fixed relationship to the steam table positioned adjacent the bottom of the steam table and close enough to the bottom of the steam table so that the temperature of any water in the water tank affects the temperature of any water in the steam table, a first water line connected from the reservoir to the water tank, a second water line connected from the water tank to the sink, said heat producing device mounted close enough to the bottom of said water tank so that operation of said heat producing device heats the water in said steam table and said water tank to provide hot water for the sink, said water tank having upper and lower base members, said base members spaced far enough apart so that the frictional resistance of the flow of water through the water tank from the first water line to the second water line is minimized so that the pressure of the water entering the sink depends primarily on the height of the water reservoir above the sink and not on the internal structure of the water tank.

12. In a catering truck, a steam table, a water reservoir, an open top sink for washing dishes and pots and pans, and a heat producing device, said water reservoir mounted above the steam table and the sink, said steam table comprising an open top tank, a water tank in fixed relationship to the steam table positioned adjacent the bottom of the steam table and close enough to the bottom of the steam table so that the temperature of any water in the water tank affects the temperature of any water in the steam table, a first water line connected from the reservoir to the water tank, a second water line connected from the water tank to the sink, said heat producing device mounted close enough to the bottom of said water tank so that the operation of said heat producing device heats the water in the steam table to provide hot water for the sink, said water tank comprising upper and lower horizontal base members and side walls whereby the frictional resistance to the flow of water through the water tank from the first water line to the second water line is minimized and the flow of water from the first water line entering said water tank to the second water line leaving the water tank is generally unobstructed so that the pressure of the water entering the sink depends primarily on the height of the water reservoir above the sink and not on the internal structure of the water tank.

13. In a catering truck, a steam table, a sink for washing dishes and pots and pans, a water reservoir mounted above the steam table and the sink, said steam table comprising an open top tank, said open top tank adapted to be filled with water for heating food, a water tank adjacent to said open top tank, a heat producing device for heating the water in at least one of said tanks whereby the temperature of the water in said at least one of said tanks controls the temperature of the water in the other tank, a first water line connected from the water reservoir to water tank, a second water line connected from the water tank to the sink so that water from the reservoir is gravity fed to the water tank and the sink, whereby said heat producing device heats the water in said at least one tank both to heat the water in the other tank and to provide hot water to the sink said water tank having upper and lower base members, said base members spaced far enough apart so that the frictional resistance of the flow of water through the water tank from the first water line to the second water line is minimized so that the pressure of the water entering the sink depends primarily on the height of the water reservoir above the sink and not on the internal structure of the water tank.

14. In a catering truck, a steam table, a sink for washing dishes and pots and pans, a water reservoir mounted above the steam table and the sink, said steam table comprising an open top tank, said open top tank adapted to be filled with water for heating food, a water tank adjacent to said open top tank, a heat producing device for heating the water in at least one of said tanks whereby the temperature of the water in said at least one of said tanks controls the temperature of the water in the other tank, a first water line connected from the water reservoir to water tank, a second water line connected from the water tank to the sink so that water from the reservoir is gravity fed to the water tank and the sink, whereby said heat producing device heats the water in said at least one tank both to heat the water in the other tank and to provide hot water to the sink, said water tank comprising upper and lower horizontal base members and side walls whereby the frictional resistance of the flow of water through the water tank from the first water line to the second water line is minimized and the flow of water from the first water line entering said water tank to the second water line leaving the water tank is generally unobstructed so that the pressure of the water entering the sink depends primarily on the height of the water reservoir above the sink and not on the internal structure of the water tank.

15. In a catering truck, a steam table, a water reservoir, a sink for washing dishes and pots and pans, a water tank and a heat producing device, said water reservoir mounted above the water tank and the sink, said steam table comprising an open tank, said water tank positioned adjacent the steam table, a first water line connected from the reservoir to the water tank, a second water line connected from the water tank to the sink, said heat producing device in fixed relationship to the water tank and the steam table for heating the water therein, whereby the heated water in the water tank flows under the force of gravity to the sink to provide hot water for the sink, the internal structure of said water tank such that the frictional resistance of the flow of water through the water tank from the first water line to the second water line is minimized so that the pressure of the heated water entering the sink depends on the height of the water reservoir above the sink and not on the internal structure of the water tank.

16. The apparatus described in claim 15 wherein the water tank comprises surfaces connected together to enclose a volume, said water tank having no bends, the separation of the surfaces large enough so that the flow of water from the first water line entering said water tank to the second water line leaving the water tank is generally unobstructed.

* * * * *

UNITED STATES PATENT AND TRADEMARK OFFICE
CERTIFICATE OF CORRECTION

PATENT NO. : 4,274,391
DATED : June 23, 1981
INVENTOR(S) : Vahe Karapetian

It is certified that error appears in the above-identified patent and that said Letters Patent are hereby corrected as shown below:

Claim 4, line 1, the number 8 is replaced by the number 3.

Claim 8, line 6, the word "heatng" is replaced by the word heating

Signed and Sealed this

Fifteenth Day of September 1981

[SEAL]

*Attest:*

*Attesting Officer*

GERALD J. MOSSINGHOFF

*Commissioner of Patents and Trademarks*